United States Patent
Okunishi et al.

(10) Patent No.: US 9,388,552 B2
(45) Date of Patent: Jul. 12, 2016

(54) CONSTRUCTION MACHINE

(71) Applicant: KOBELCO CONSTRUCTION MACHINERY CO., LTD., Hiroshima-shi (JP)

(72) Inventors: Takayuki Okunishi, Hiroshima (JP); Kazuhiro Uesugi, Hiroshima (JP)

(73) Assignee: KOBELCO CONSTRUCTION MACHINERY CO., LTD., Hiroshima-shi (JP)

(*) Notice: Subject to any disclaimer, the term of this patent is extended or adjusted under 35 U.S.C. 154(b) by 114 days.

(21) Appl. No.: 14/294,528

(22) Filed: Jun. 3, 2014

(65) Prior Publication Data
US 2014/0367528 A1 Dec. 18, 2014

(30) Foreign Application Priority Data
Jun. 14, 2013 (JP) .................. 2013-125877

(51) Int. Cl.
B60D 1/62 (2006.01)
E02F 9/22 (2006.01)
E02F 9/08 (2006.01)
(Continued)

(52) U.S. Cl.
CPC ............... *E02F 9/2275* (2013.01); *E02F 3/325* (2013.01); *E02F 9/0808* (2013.01); *F16L 3/01* (2013.01); *H02G 11/00* (2013.01); *H02G 3/32* (2013.01)

(58) Field of Classification Search
CPC ........ H02G 11/00; H02G 3/32; E02F 9/2275; E02F 3/325; E02F 9/0808; E02F 9/0858; Y10S 414/131; B60R 16/0207; B60R 16/0215

USPC .................. 248/65, 53, 51; 280/421–422
See application file for complete search history.

(56) References Cited

U.S. PATENT DOCUMENTS 3,872,881 A * 3/1975 Miller ................ E02F 3/65
                                                137/355.17
5,371,942 A * 12/1994 Gold ................. B60R 16/0207
                                                29/771

(Continued)

FOREIGN PATENT DOCUMENTS

DE         42 34 550 C1      9/1993
DE     10 2011 055 631 A1    5/2012

(Continued)

OTHER PUBLICATIONS

Extended European Search Report issued Oct. 9, 2014 in Patent Application No. 14171462.6.

*Primary Examiner* — Christopher E Garft
(74) *Attorney, Agent, or Firm* — Oblon, McClelland, Maier & Neustadt, L.L.P

(57) ABSTRACT

A bar-like member includes a base end portion, a leading end portion opposite to the base end portion, and a fixed portion provided between the base end portion and the leading end portion and fixed to an upper frame. A binding band is adapted to bind the bar-like member and an arranging member together in order to fix the arranging member arranged along the bar-like member. The fixed portion of the bar-like member is formed by folding the bar-like member between the base end portion and the leading end portion, and has an outer peripheral surface fixed to the upper frame in abutting contact with the upper frame. The leading end portion of the bar-like member is positioned away from the upper frame by fixing the outer peripheral surface of the fixed portion to the upper frame.

7 Claims, 8 Drawing Sheets

(51) Int. Cl.
*F16L 3/01* (2006.01)
*E02F 3/32* (2006.01)
*H02G 11/00* (2006.01)
*H02G 3/32* (2006.01)

(56) References Cited

U.S. PATENT DOCUMENTS

| | | | | |
|---|---|---|---|---|
| 5,419,519 | A * | 5/1995 | Mangone, Jr. | F16L 3/1226 248/49 |
| 7,204,047 | B2 * | 4/2007 | Murakami | E02F 9/0866 180/69.22 |
| 2002/0021958 | A1 * | 2/2002 | Nishikawa | E02F 3/3618 414/724 |
| 2002/0070585 | A1 * | 6/2002 | Uno | B62D 25/14 296/190.08 |
| 2004/0164576 | A1 * | 8/2004 | Wright | B60R 16/0215 296/1.01 |
| 2005/0040211 | A1 * | 2/2005 | Katayama | B62D 21/186 228/170 |
| 2011/0132862 | A1 * | 6/2011 | Wimmer | B66C 13/12 212/347 |
| 2011/0226348 | A1 * | 9/2011 | Kurushima | E02F 9/08 137/343 |
| 2012/0061994 | A1 * | 3/2012 | Maeba | E02F 9/0883 296/193.06 |
| 2012/0132465 | A1 | 5/2012 | Mabuchi | |
| 2012/0151677 | A1 * | 6/2012 | Yesudhas | A61G 13/02 5/600 |
| 2013/0067901 | A1 | 3/2013 | Masuda et al. | |
| 2013/0093214 | A1 * | 4/2013 | Ushiroguchi | E02F 9/2275 296/193.01 |
| 2013/0108404 | A1 * | 5/2013 | Okumura | E02F 9/2095 414/687 |
| 2013/0115036 | A1 * | 5/2013 | Yamato | E02F 9/0858 414/687 |
| 2014/0003901 | A1 * | 1/2014 | Takagi | E02F 3/30 414/687 |
| 2014/0021781 | A1 * | 1/2014 | Satake | E02F 9/0858 307/9.1 |
| 2014/0205411 | A1 * | 7/2014 | Zheng | E02F 9/0816 414/687 |
| 2015/0075895 | A1 * | 3/2015 | Inada | B60K 13/04 180/309 |

FOREIGN PATENT DOCUMENTS

| | | | |
|---|---|---|---|
| EP | 2 546 419 A1 | 1/2013 | |
| JP | 2005-48495 | 2/2005 | |
| JP | 2005-068962 A | 3/2005 | |
| JP | 2007-077633 A * | 3/2007 | E02F 9/08 |

* cited by examiner

CONSTRUCTION MACHINE

BACKGROUND OF THE INVENTION

1. Field of the Invention

The present invention relates to a construction machine in which flexible hydraulic piping and the like are arranged.

2. Description of the Related Art

A construction machine is conventionally known which includes a lower traveling body and an upper slewing body mounted on the lower traveling body so as to be able to slew. Hydraulic equipment such as a control valve and various types of electric equipment are disposed on the upper slewing body (see, for example, Japanese Patent Application Laid-open No. 2005-048495).

Hydraulic piping connected to the hydraulic equipment and electric wiring connected to the electric equipment may come into contact with and be damaged by a sharp corner portion of a plate-like member (for example, a vertical plate or a horizontal beam) providing an upper frame of the upper slewing body. Thus, an arranging member including at least one of either the hydraulic piping or the electric wiring needs to be fixed so as not to move at an arranging position.

Specifically, nut members and clip members are welded to the upper frame at a plurality of positions. An arranging member arranged along the upper frame is held using the clip members and holders fastened to the nut members.

However, when the arranging member is arranged to a position away from the vertical plate and the horizontal beam, for example, a position above the vertical plate and the horizontal beam, no member to which the nut members and the clip members are welded is present above the vertical plate and the horizontal beam. Thus, disadvantageously, the arranging member fails to be fixed at the arranging position.

SUMMARY OF THE INVENTION

An object of the present invention is to provide a construction machine that allows a arranging member to be fixed to an upper frame using a relatively simple configuration.

To accomplish the object, the present invention provides a construction machine in which a flexible arranging member is arranged, the construction machine including an upper frame having a bottom plate and a standing plate standing on the bottom plate, a bar-like member having a leading end portion, a base end portion opposite to the leading end portion, and a fixed portion provided between the leading end portion and the base end portion and fixed to the upper frame, and a binding band for binding the bar-like member and the arranging member together in order to fix the arranging member arranged along the bar-like member, wherein the fixed portion of the bar-like member is formed by folding the bar-like member between the base end portion and the leading end portion, and has an outer peripheral surface fixed to the upper frame in abutting contact with the upper frame, and the leading end portion of the bar-like member is positioned away from the upper frame by fixing the outer peripheral surface of the fixed portion to the upper frame.

According to the present invention, the leading end portion of the bar-like member is positioned away from the upper frame. Furthermore, the bar-like member and the arranging member arranged along the bar-like member can be bound together using the binding band. This allows the arranging member to be fixed at a position away from the upper frame.

Additionally, since the outer peripheral surface of the fixed portion is fixed to the upper frame in abutting contact with the upper frame, the bar-like member is supported by the upper frame so as not to be deflected even with an increased number of arranging members (the increased weight of the arranging members). Thus, the arranging member can be reliably fixed at the arranging position.

DESCRIPTION OF THE EMBODIMENTS

Embodiments of the present invention will be described below with reference to the accompanying drawings. The embodiments described below are examples in which the present invention is embodied and are not intended to limit the technical scope of the present invention. The figures show, by arrows, an up-down direction, a front-rear direction, and a lateral direction as viewed by an operator taking an operator's seat. Unless otherwise specified, the description will be given in accordance with the directions shown by the arrows.

Figure 1:
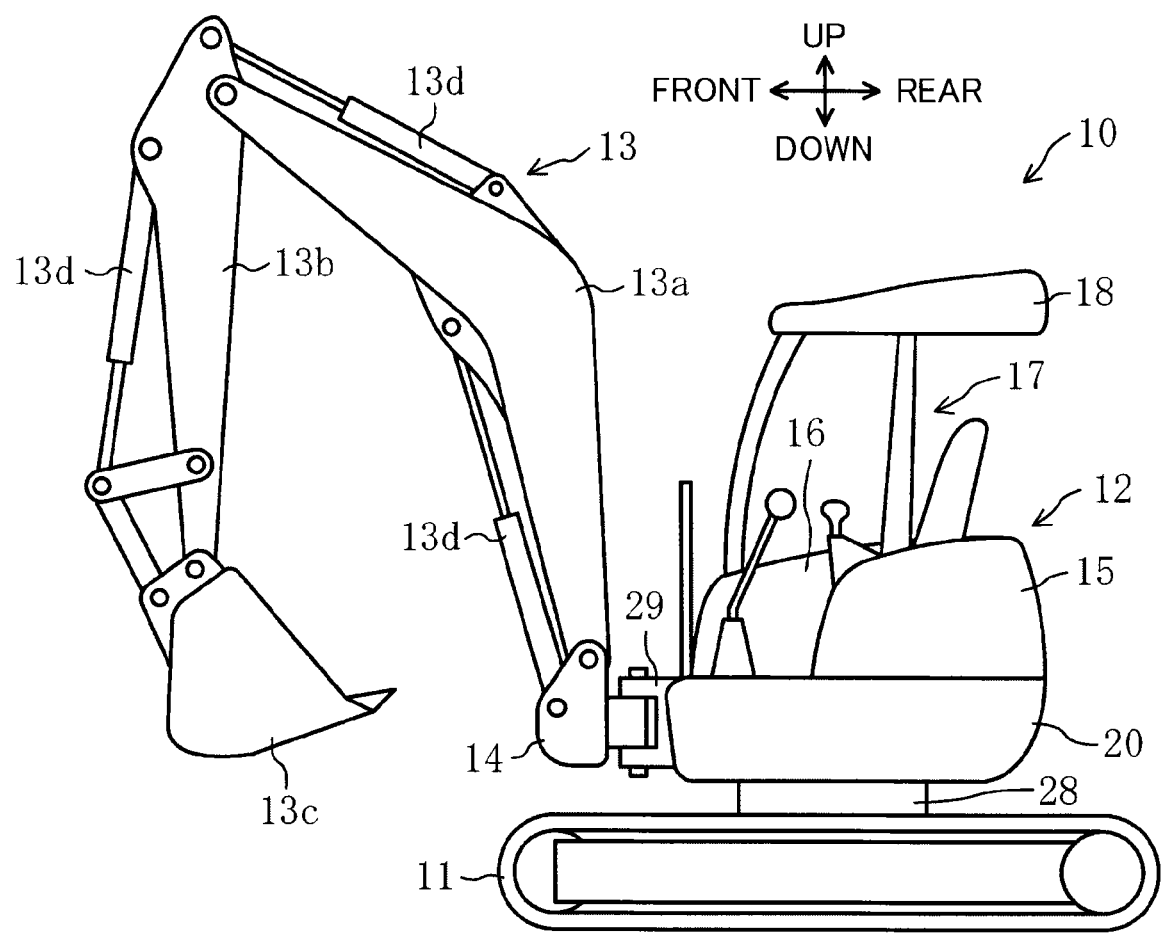
FIG. 1 is a side view showing a configuration of a construction machine according to an embodiment of the present invention.
Figure 2:
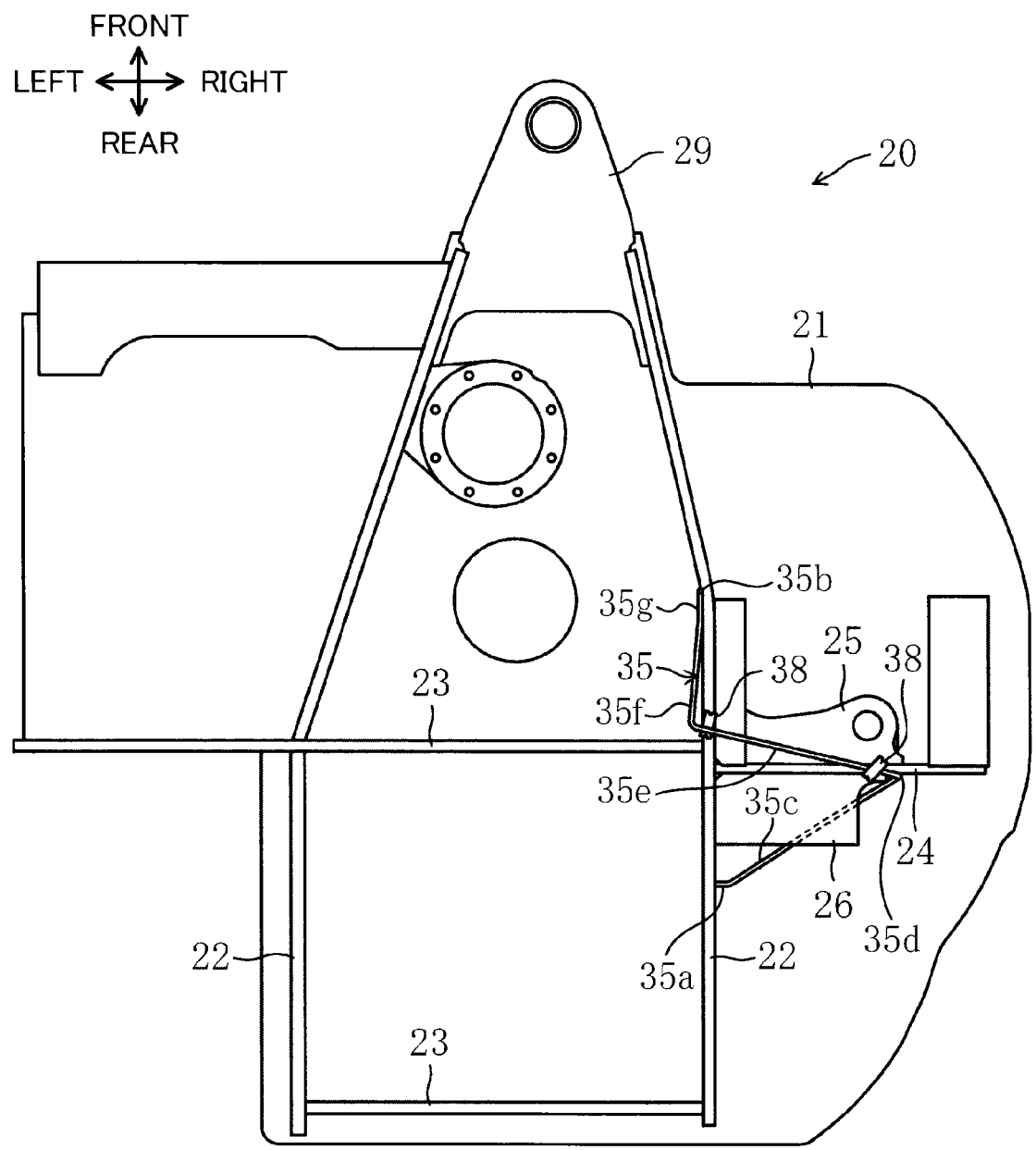
FIG. 2 is a plan view showing a configuration of an upper frame.
Figure 3:
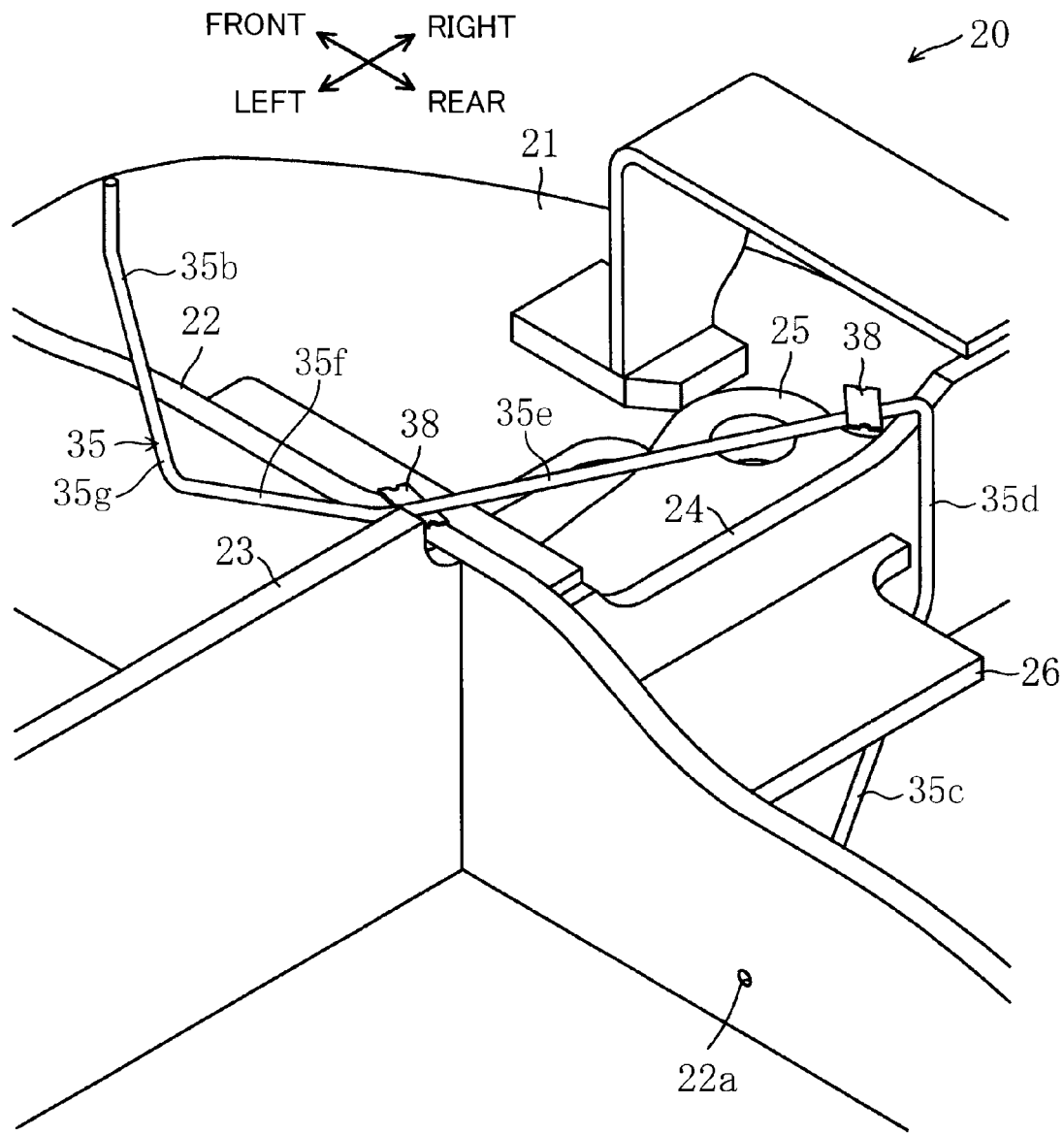
FIG. 3 is a perspective view of an upper portion of the upper frame as viewed from a rear left side.
Figure 4:
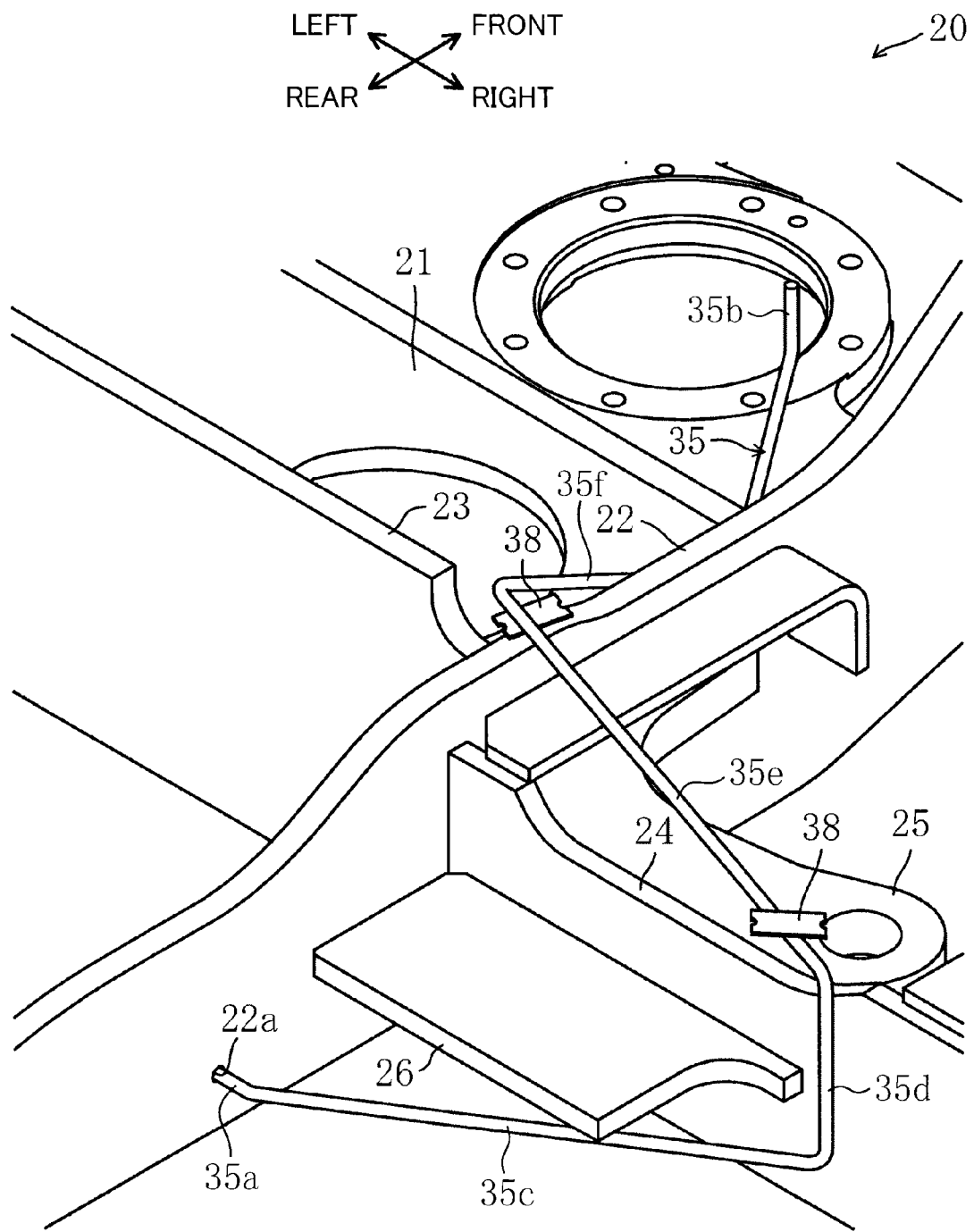
FIG. 4 is a perspective view of the upper portion of the upper frame as viewed from a rear right side.

FIG. 1 is a side view showing a configuration of a construction machine according to an embodiment of the present invention. As shown in FIG. 1, a construction machine 10 is a small-sized rear small-swing-radius type, and includes a lower traveling body 11 of a crawler type and an upper slewing body 12 mounted on the lower traveling body 11 so as to be able to slew. The upper slewing body 12 includes an upper frame 20 supported by the lower traveling body 11 via a ring-like slewing bearing 28 so as to be able to slew.

The upper slewing body 12 includes an engine room 15 provided in the rear of the upper slewing body 12 to house an engine and the like (not shown in the drawings). The upper slewing body 12 includes a side machine room 16 provided in a right portion of the upper slewing body 12 and in which a fuel tank, a hydraulic oil tank, and the like (not shown in the drawings) are housed. The upper slewing body 12 includes an operation space 17 provided in a left portion of the upper slewing body 12 and in which an operator's seat, an operation lever, and the like are provided. A hood 18 is installed above the upper slewing body 12 to cover the operation space 17 from above.

An attachment 13 is mounted in a front portion of the upper slewing body 12. The attachment 13 is supported by the upper frame 20 so as to be raised and lowered and swung in a lateral direction. Specifically, the attachment 13 is adapted to perform an excavation operation and the like. The attachment 13 has a swing bracket 14 mounted to a front bracket 29 of the upper slewing body 12 so as to be able to rotate around an axis perpendicular to the ground, relative to the front bracket 29, a boom 13a having a base end portion mounted to the swing bracket 14 so as to be able to rotate around a horizontal axis relative to the swing bracket 14, an arm 13b rotatably mounted to a leading end portion of the boom 13a, and a bucket 13c rotatably mounted to a leading end portion of the arm 13b.

Furthermore, the construction machine 10 includes a plurality of hydraulic cylinders 13d extending and contracting in accordance with an operation of the operation lever or the like to drive the attachment 13. Specifically, the hydraulic cylinders 13d include a swing cylinder (not shown in the drawings) for swinging the swing bracket 14 in the lateral direction, a hydraulic cylinder for rotating the boom 13a, a hydraulic cylinder for rotating the arm 13b, and a hydraulic cylinder for rotating the bucket 13c.

As shown in FIGS. 2 to 5, the upper frame 20 includes a bottom plate 21, a lateral pair of vertical plates 22 standing on the bottom plate 21 and extending in a front-rear direction, a connection beam 23 extending in the lateral direction to connect the paired vertical plates 22 together, and a horizontal beam 24 connected to a right side surface of the right side vertical plate 22 and extending in the lateral direction orthogonally to the vertical plate 22. According to the present embodiment, the vertical plate 22 and the horizontal beam 24 correspond to a standing plate standing on the bottom plate 21.

The pair of vertical plates 22 is located in a laterally central area of the upper frame 20 to reinforce the strength and rigidity of the upper frame 20 in the front-rear direction. The front bracket 29 is attached to front portions of the vertical plates 22 to receive loads during operation of the attachment 13.

A cylinder bracket 25 to which a swing cylinder (not shown in the drawings) is connected is welded to a front side surface of the horizontal beam 24. A left end portion of the cylinder bracket 25 is welded to a right side surface of the right-side vertical plate 22. A reinforcement rib 26 bridged between the horizontal beam 24 and the right-side vertical plate 22 is welded to a rear side surface of the horizontal beam 24.

Hydraulic equipment and various types of electric equipment (not shown in the drawings) are disposed on the upper frame 20. Hydraulic piping connected to the hydraulic equipment and electric wiring connected to the electric equipment (a member including at least one of either flexible hydraulic piping or electric wiring is hereinafter referred to as a arranging member 30) may come into contact with and be damaged by a sharp corner portion of the vertical plate 22 and the horizontal beam 24. Consequently, the arranging member 30 needs to be fixed so as not to move at an arranging position. Thus, a bar-like member 35 for fixing the arranging member 30 is disposed on an arranging route for the arranging member 30.

The bar-like member 35 is a bar-like member extending along the arranging direction of the arranging member 30. Specifically, the bar-like member 35 includes a base end portion 35a, a leading end portion 35b opposite to the base end portion 35a, and a first inclined portion 35c, a first fixed portion 35d, an upper disposed portion 35e, a second inclined portion 35f, and a second fixed portion 35g all provided between the base end portion 35a and the leading end portion 35b.

Figure 5:
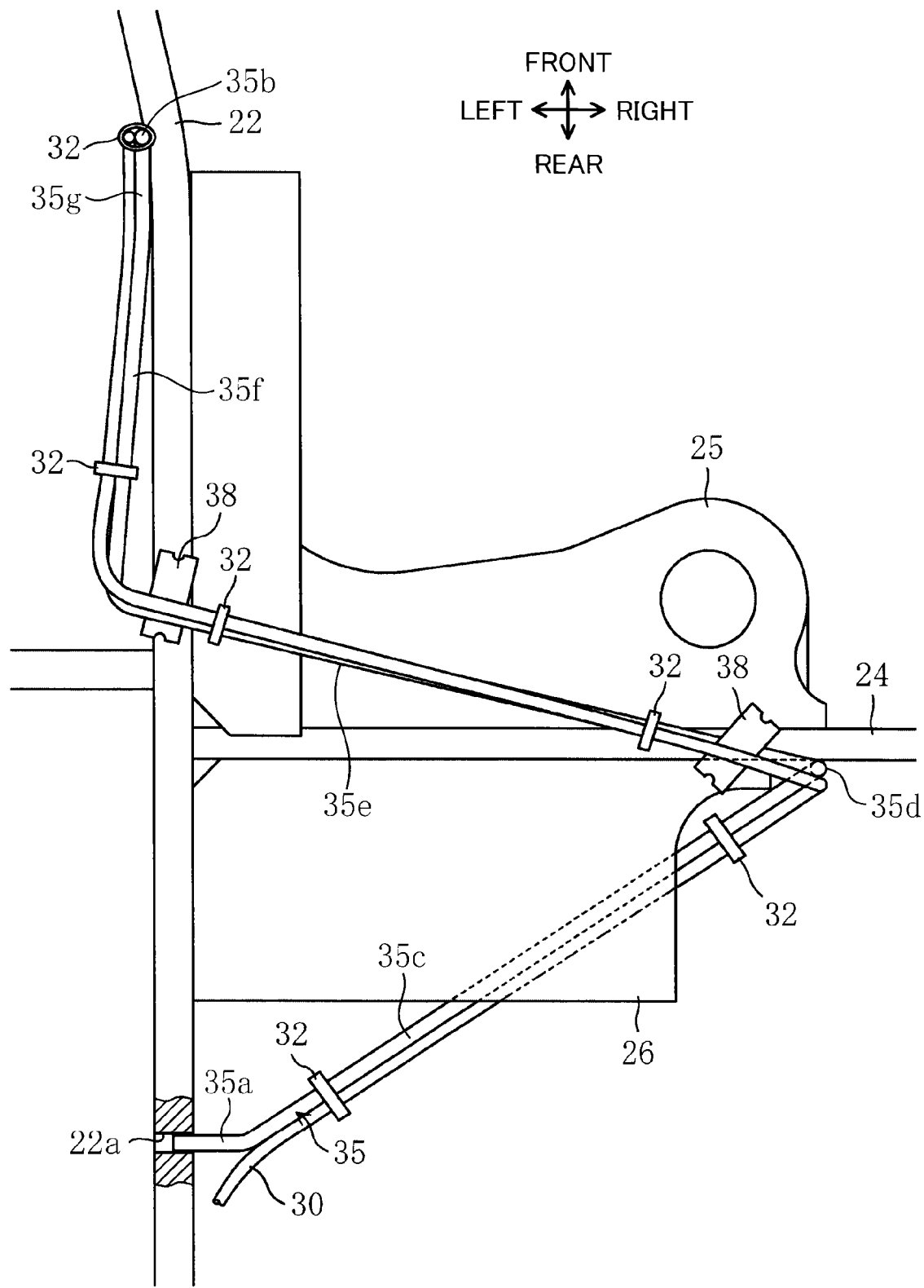
FIG. 5 is a plan view showing an arranging route for a arranging member.

The base end portion 35a of the bar-like member 35 is attached to the right side surface of the right-side vertical plate 22 behind the horizontal beam 24. Specifically, as shown in FIG. 5, the right-side vertical plate 22 includes an insertion hole 22a formed therein and penetrating the right-side vertical plate 22 in the lateral direction. The base end portion 35a of the bar-like member 35 is welded to the right-side vertical plate 22 in a state where the base end portion 35a of the bar-like member 35 is inserted through the insertion hole 22a from the right side.

The bar-like member 35 is folded at a plurality of positions between the base end portion 35a and the leading end portion 35b. Specifically, the first inclined portion 35c of the bar-like member 35 is folded from a right end portion of the base end portion 35a attached to the right side surface of the vertical plate 22 toward the rear side surface of the horizontal beam 24. Furthermore, the first inclined portion 35c inclines forward as the first inclined portion 35c extends rightward from the right end portion of the base end portion 35a.

The first fixed portion 35d of the bar-like member 35 is folded upward, along the rear side surface of the horizontal beam 24, from a front end portion of the first inclined portion 35c extending to the rear side surface of the horizontal beam 24. A part (a forward facing portion) of an outer peripheral surface of the first fixed portion 35d is in abutting contact with the rear side surface of the horizontal beam 24 in the front-rear direction. An outer peripheral surface of the first fixed portion 35d is welded to the horizontal beam 24 in abutting contact with the horizontal beam 24. Thus, the first fixed portion 35d is fixed to the horizontal beam 24. The first fixed portion 35d of the bar-like member 35 may be fixed to the horizontal beam 24 using a fastening bolt or the like.

An upper end portion of the first fixed portion 35d projects upward from the horizontal beam 24. The upper disposed portion 35e of the bar-like member 35 is folded leftward from the upper end portion of the first fixed portion 35d so as to overlap the horizontal beam 24 and the vertical plate 22 from above. The upper disposed portion 35e inclines forward so as to cross the horizontal beam 24 and the right-side vertical plate 22 in plan view as the upper disposed portion 35e extends leftward from the upper end portion of the first fixed portion 35d. A left end portion of the upper disposed portion 35e is located leftward of a left side surface of the right-side vertical plate 22.

The second inclined portion 35f of the bar-like member 35 is folded forward from the left end portion of the upper disposed portion 35e. The second inclined portion 35f extends forward and rightward and inclines downward so as to approach a left side wall surface of the right-side vertical plate 22 as the second inclined portion 35f extends forward from the left end portion of the upper disposed portion 35e.

The second inclined portion 35f extends to the left side surface of the right-side vertical plate 22. The second fixed portion 35g of the bar-like member 35 is folded upward from a front end portion of the second inclined portion 35f along the left side wall surface of the vertical plate 22. The second fixed portion 35g inclines forward as the second fixed portion 35g extends upward. Furthermore, a part (a rightward facing portion) of an outer peripheral surface of the second fixed portion 35g is in abutting contact with the left side surface of the vertical plate 22 in the lateral direction. The outer peripheral surface of the second fixed portion 35g is welded to the right-side vertical plate 22 in contact with the left side surface of the right-side vertical plate 22. Thus, the second fixed portion 35g is fixed to the left side surface of the right-side vertical plate 22.

The first fixed portion 35d and the second fixed portion 35g are fixed to the upper frame 20 (the vertical plate 22 and the horizontal beam 24) to position the leading end portion 35b of the bar-like member 35 upward away from the vertical plate 22. Specifically, an upper end portion of the second fixed portion 35g is connected to the leading end portion 35b. The leading end portion 35b extends upward from the upper end portion of the second fixed portion 35g and projects upward from the right-side vertical plate 22. In other words, according to the present embodiment, the leading end portion 35b corresponds to a part of the bar-like member 35 which is closer to a leading end of the bar-like member 35 than the second inclined portion 35f and which is located above an upper surface of the right-side vertical plate 22. The second fixed portion 35g corresponds to a part of the bar-like member 35 which is closer to the leading end of the bar-like member 35 than the second inclined portion 35f and which is disposed at a height position equivalent to the upper surface of the right-side vertical plate 22 and below the height position.

The arranging member 30 is arranged along the bar-like member 35. A plurality of binding bands 32 is disposed such that the binding bands 32 lie at intervals in a longitudinal direction of the bar-like member 35. The arranging member 30 is fixed to the bar-like member 35 by being bound to the bar-like member 35 using the plurality of binding bands 32. In other words, the binding bands 32 binds the bar-like member 35 and the arranging member 30 together in order to fix the arranging member 30 arranged along the bar-like member 35. The number and binding positions of the binding bands 32 are only illustrative, and the present invention is not limited to this configuration.

Furthermore, a pair of support plates 38 is attached to the bar-like member 35 at positions where the bar-like member 35 overlaps the vertical plate 22 and the horizontal beam 24 in plan view (that is, the positions correspond to the upper disposed portion 35e) in order to support the arranging member 30 from below. Specifically, as shown in FIG. 5, the support plates 38 are provided at the intersection point between the upper disposed portion 35e and the right side vertical plate 22 and at the intersection point between the upper disposed portion 35e and the horizontal beam 24 in plan view. Additionally, each of the support plates 38 is located between the binding bands 32.

As described above, the construction machine 10 according to the present embodiment allows the arranging member 30 including at least one of either the hydraulic piping or the electric wiring to be fixed to the upper frame 20 using a relatively simple configuration.

Specifically, according to the conventional technique, nut members and clip members are welded to the upper frame 20 at a plurality of positions. The arranging member 30 is fixed using the clip members and holders fastened to the nut members. However, when the arranging member 30 is arranged upward from the vertical plate 22 and the horizontal beam 24, no member to which the nut members and the clip members are welded is present above the vertical plate 22 and the horizontal beam 24. Thus, disadvantageously, the arranging member 30 fails to be fixed at the arranging position.

In contrast, according to the present embodiment, the base end portion 35a of the bar-like member 35 is attached to the right side surface of the vertical plate 22, and the leading end portion 35b is located above the vertical plate 22. Thus, the arranging member 30 can be fixed at a position above the vertical plate 22 by binding the arranging member 30 arranged along the bar-like member 35 and the bar-like member 35 together using the binding bands 32.

Furthermore, the first fixed portion 35d and the second fixed portion 35g are fixed to the upper frame 20 (the horizontal beam 24 and the right-side vertical plate 22) in abutting contact with the upper frame 20. Thus, even with an increased number of arranging members 30, the bar-like member 35 can be supported using the upper frame 20, so as not to be deflected. Therefore, the arranging member 30 can be reliably fixed at the arranging position.

The base end portion 35a of the bar-like member 35 is attached to the right-side vertical plate 22, and the leading end portion 35b of the bar-like member 35 projects upward from the right-side vertical plate 22. Thus, the arranging member 30 arranged along the bar-like member 35 can be fixed at a position above the vertical plate 22 using the binding bands 32.

The base end portion 35a of the bar-like member 35 is attached to the right side surface of the right-side vertical plate 22. The outer peripheral surface of the second fixed portion 35g of the bar-like member 35 is in abutting contact with the left side surface of the right-side vertical plate 22. Thus, the bar-like member 35 can be fixed to the vertical plate 22 with the right-side vertical plate 22 sandwiched between the base end portion 35a of the bar-like member 35 and the second fixed portion 35g. Consequently, even with an increased number of arranging members 30, the bar-like member 35 can be supported (reinforced) by the vertical plate 22 so as not be deflected in the thickness direction (lateral direction) of the vertical plate 22.

The base end portion 35a of the bar-like member 35 is inserted through the insertion hole 22a in the right-side vertical plate 22 in the lateral direction. Thus, movement of the bar-like member 35 in a height direction (up-down direction) can be regulated to position the bar-like member 35 in the height direction.

Moreover, the outer peripheral portion of the first fixed portion 35d of the bar-like member 35 is in abutting contact with the rear side surface of the horizontal beam 24 in the front-rear direction. Thus, during assembly after the base end portion 35a of the bar-like member 35 is inserted through the insertion hole 22a and before the bar-like member 35 is fixed to the upper frame 20, the bar-like member 35 can be slid along the rear side surface of the horizontal beam 24. In other words, during the assembly, the position of the bar-like member 35 can be adjusted in the lateral direction, while the movement of the bar-like member 35 in the front-rear direction is being regulated. As a result, the lateral positional adjustment allows the bar-like member 35 to be positioned in the lateral direction so as to bring a part of the outer peripheral surface of the second fixed portion 35g into abutting contact with the left side surface of the vertical plate 22.

Since the bar-like member 35 includes the upper disposed portion 35e, the upper disposed portion 35e of the bar-like member 35 allows the arranging member 30 to be arranged along the upper disposed portion 35e so as to overlap the horizontal beam 24 and the right-side vertical plate 22 from above. However, if the arranging member 30 is arranged above the horizontal beam 24 and the vertical plate 22, when, for example, the construction machine 10 vibrates, a part of the arranging member 30 positioned between the binding bands 32 may move downward and come into contact with and be damaged by a corner portion of an upper end portion of the horizontal beam 24 or the vertical plate 22. Thus, as in the present embodiment, the support plates 38, which support the arranging member 30 from below, are provided to enable the arranging member 30 to be restrained from being damaged.

Since the support plates 38 are provided at the intersection point between the upper disposed portion 35e and the horizontal beam 24 and at the intersection point between the upper disposed portion 35e and the vertical plate 22 in plan view, the arranging member 30 can be reliably prevented from being damaged.

Other Embodiments

The embodiment to which the present invention is applied may have any of the following configurations.

The bar-like member 35 according to the present embodiment has the second inclined portion 35f folded forward from the left end portion of the upper disposed portion 35e, disposed to overlap the vertical plate 22 and the horizontal beam 24 from above, toward the left side wall surface of the vertical plate 22. The second inclined portion 35f extends rightward and forward and inclines downward so as to approach the left side wall surface of the vertical plate 22 as the second inclined portion 35f extends forward. The bar-like member 35 is not limited to this configuration.

Figure 6:
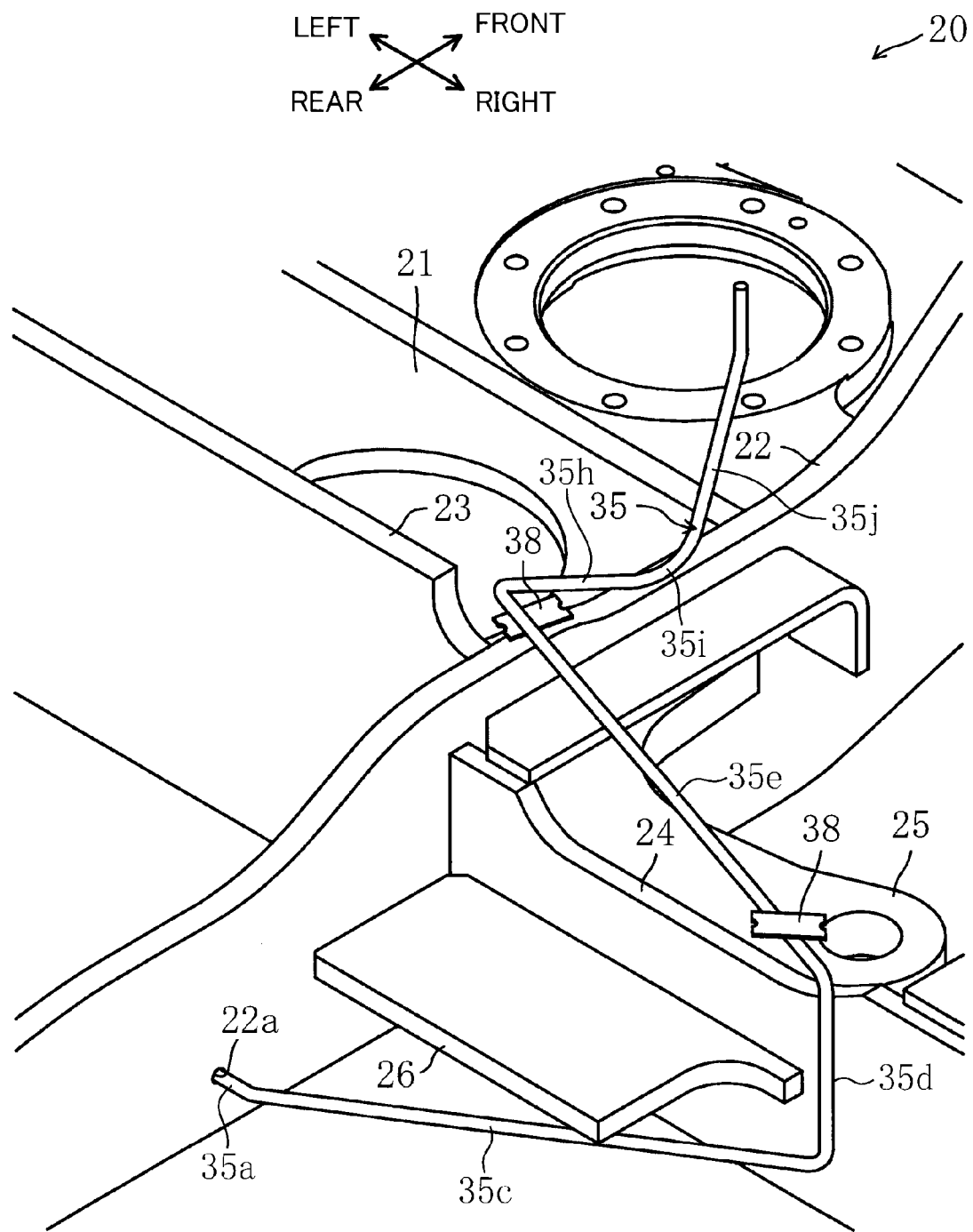
FIG. 6 is a perspective view of an upper portion of an upper frame according to another embodiment as seen from a rear right side.

For example, the bar-like member 35 according to an embodiment shown in FIG. 6 includes a second inclined portion 35h folded from the left end portion of the upper disposed portion 35e disposed to overlap the vertical plate 22 and the horizontal beam 24 from above toward the upper surface of the vertical plate 22, a second fixed portion 35i connected to the front end portion of the second inclined portion 35h, and a leading end portion 35j folded upward from the front end portion of the second fixed portion 35i.

The second inclined portion 35h extends rightward and forward from the left end portion of the upper disposed portion 35e, and inclines downward so as to approach the upper surface of the vertical plate 22 as the second inclined portion 35h extends forward. The second fixed portion 35i has an outer peripheral surface fixed to the upper surface of the vertical plate 22 in abutting contact with the upper surface of the vertical plate 22.

The first fixed portion 35d and the second fixed portion 35i are fixed to the upper frame 20 to position the leading end portion 35j upward away from the vertical plate 22. Specifically, the leading end portion 35j inclines upward as the leading end portion 35j extends forward from the front end portion of the second fixed portion 35i. In other words, the leading end portion 35j extends upward from the second fixed portion 35i disposed on the upper surface of the vertical plate 22, and is consequently located above the vertical plate 22.

Furthermore, according to this embodiment, the leading end portions 35b and 35j of the bar-like member 35 project upward from the vertical plate 22. However, the leading end portions of the bar-like member 35 are not limited to the upward position but may be placed at any position away from the vertical plate 22 (upper frame 20).

Figure 7:
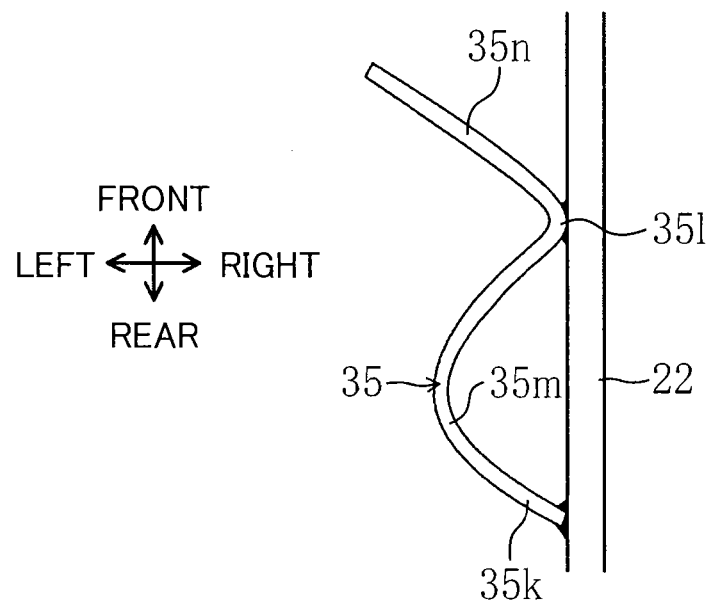
FIG. 7 is a plan view showing a configuration of a bar-like member according to another embodiment.

In an embodiment shown in FIG. 7, the bar-like member 35 includes a base end portion 35k and a fixed portion 35l welded to the left side wall surface of the vertical plate 22, a curved connection portion 35m that connects the base end portion 35k and the fixed portion 35l together, and a leading end portion 35n extending from a front end portion of the fixed portion 35l toward a left side of the vertical plate 22. The fixed portion 35l has an outer peripheral surface welded to the vertical plate 22 in abutting contact with the left side surface of the vertical plate 22.

The fixed portion 35l is fixed to the vertical plate 22 to position the leading end portion 35n leftward away from the vertical plate 22. Specifically, the leading end portion 35n inclines leftward as the leading end portion 35n extends forward from a front end portion of the fixed portion 35l. Thus, the leading end portion 35n of the bar-like member 35 extends leftward from the fixed portion 35l located in abutting contact with the left side surface of the vertical plate 22 and is consequently positioned leftward away from the vertical plate 22. Furthermore, according to this embodiment, the base end portion 35k of the bar-like member 35 is welded to the vertical plate 22. This allows the start point of arranging to be accurately set.

Figure 8:
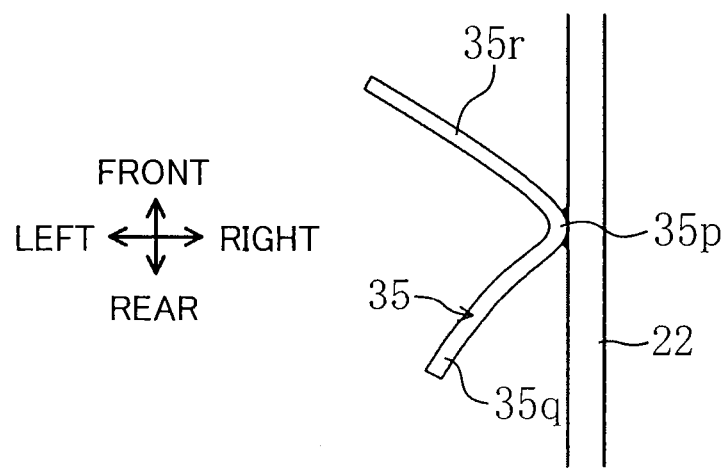
FIG. 8 is a plan view showing a configuration of a bar-like member according to another embodiment.

Furthermore, according to an embodiment shown in FIG. 8, the bar-like member 35 is folded into a V shape. Specifically, the bar-like member 35 includes a fixed portion 35p fixed to the left side surface of the vertical plate 22, a base end portion 35q extending rearward from the fixed portion 35p, and a leading end portion 35r extending forward from the fixed portion 35p.

The fixed portion 35p has an outer peripheral surface welded to the vertical plate 22 in contact with the left side surface of the vertical plate 22. The base end portion 35q inclines leftward as the base end portion 35q extends rearward from a rear end portion of the fixed portion 35p.

The outer peripheral surface of the fixed portion 35p is fixed to the vertical plate 22 to position the leading end portion 35r leftward away from the vertical plate 22. Specifically, the leading end portion 35r inclines leftward as the leading end portion 35r extends forward from a front end portion of the fixed portion 35p. In other words, the base end portion 35q and leading end portion 35r of the bar-like member 35 extend leftward from the fixed portion 35p lying in abutting contact with the left side surface of the vertical plate 22, and are consequently positioned leftward away from the vertical plate 22. In this case, the base end portion 35q and leading end portion 35r of the bar-like member 35 are free ends released from the vertical plate 22. This improves the degree of freedom in arranging of the arranging member 30.

Figure 9:
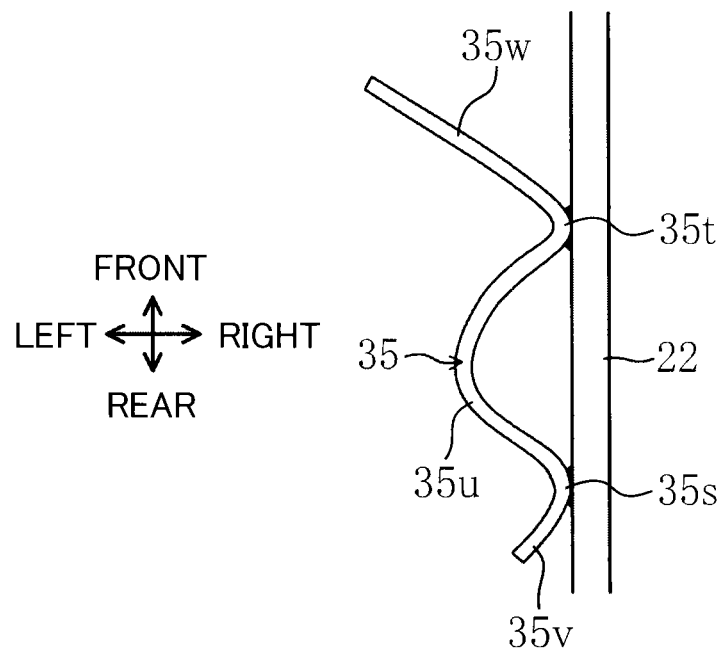
FIG. 9 is a plan view showing a configuration of a bar-like member according to another embodiment.

Furthermore, according to an embodiment shown in FIG. 9, an increased number of times that the bar-like member 35 is folded allow the bar-like member 35 and the vertical plate 22 to be brought into abutting contact with each other at two positions, with the abutting contact portions welded.

Specifically, the bar-like member 35 shown in FIG. 9 includes two fixed portions 35s and 35t, a curved connection portion 35u that connects both fixed portions 35s and 35t together, a base end portion 35v extending rearward from the fixed portion 35s, and a leading end portion 35w extending forward from the fixed portion 35t. Each of the fixed portion 35s and 35t has an outer peripheral surface welded to the vertical plate 22 in abutting contact with the left side surface of the vertical plate 22. The base end portion 35v inclines leftward as the base end portion 35v extends rearward from a rear end portion of the fixed portion 35s.

The fixed portions 35s and 35t are fixed to the vertical plate 22 to position the leading end portion 35w leftward away from the vertical plate 22. Specifically, the leading end portion 35w inclines leftward as the leading end portion 35w extends forward from a front end portion of the fixed portion 35t. In other words, the base end portion 35v and the leading end portion 35w extend leftward from the fixed portions 35s and 35t lying in abutting contact with the left side surface of the vertical plate 22, and are consequently positioned leftward away from the vertical plate 22.

In this case, the bar-like member 35 and the vertical plate 22 are welded to each other at an increased number of positions. This allows the bar-like member 35 to be reliably fixed to the vertical plate 22.

In the embodiments, the example has been described in which the leading end portion of the bar-like member 35 is located upward or leftward away from the upper frame 20 (vertical plate 22). However, the direction in which the leading end portion of the bar-like member 35 lies away from the upper frame 20 is not limited to the these directions but may be a horizontal direction or an up-down direction.

The leading end portion of the bar-like member 35 may be located away from the vertical plate 22 and the bottom plate 21.

The specific embodiments include the invention configured as described below.

To accomplish the object, the present invention provides a construction machine in which a flexible arranging member is arranged, the construction machine including an upper frame having a bottom plate and a standing plate standing on the bottom plate, a bar-like member having a leading end portion, a base end portion opposite to the leading end portion, and a fixed portion provided between the leading end portion and the base end portion and fixed to the upper frame, and a binding band for binding the bar-like member and the arranging member together in order to fix the arranging member arranged along the bar-like member, wherein the fixed portion of the bar-like member is formed by folding the bar-like member between the base end portion and the leading end portion, and has an outer peripheral surface fixed to the upper frame in abutting contact with the upper frame, and the leading end portion of the bar-like member is positioned away from the upper frame by fixing the outer peripheral surface of the fixed portion to the upper frame.

According to the present invention, the leading end portion of the bar-like member is positioned away from the upper frame. Furthermore, the bar-like member is folded between the base end portion and the leading end portion, and the thus formed outer peripheral surface of the fixed portion is fixed to the upper frame in abutting contact with the upper frame. The arranging member is arranged along the bar-like member and bound to the bar-like member using the binding band. Thus, the arranging member is fixed to the bar-like member.

Such a configuration allows the arranging member including at least one of either hydraulic piping or electric wiring to be fixed to the upper frame using a relatively simple configuration. Specifically, according to the conventional technique, nut members and clip members are welded to the upper frame at a plurality of positions. The arranging member is fixed using the clip members and holders fastened to the nut members. However, when the arranging member is arranged in a direction away from the upper frame, for example, upward from the standing plate, no member to which the nut members and the clip members are welded is present above the standing plate. Thus, disadvantageously, the arranging member fails to be fixed at the arranging position.

In contrast, according to the present invention, the leading end portion of the bar-like member is located away from the upper frame. Thus, the arranging member can be fixed at a position away from the upper frame by binding the arranging member arranged along the bar-like member and the bar-like member together using the binding band.

Furthermore, the outer peripheral surface of the fixed portion is fixed to the upper frame in abutting contact with the upper frame. Thus, even with an increased number of arranging members (the increased weight of the arranging member), the bar-like member can be supported by the upper frame, so as not to be deflected. Therefore, the arranging member can be reliably fixed at the arranging position.

In the construction machine, preferably, the base end portion of the bar-like member is attached to the upper frame, and the leading end portion of the bar-like member is located above the standing plate.

In this aspect, the base end portion of the bar-like member is attached to the upper frame, and the leading end portion of the bar-like member is located above the standing plate. Thus, the arranging member arranged along the bar-like member can be fixed at a position above the standing plate using the binding band.

In the construction machine, preferably, the base end portion of the bar-like member is attached to one side surface of the standing plate, and the bar-like member is folded in such a manner that the outer peripheral surface of the fixed portion is in abutting contact with another side surface of the standing plate.

In this aspect, the base end portion of the bar-like member is attached to one side surface of the standing plate, and the outer peripheral surface of the fixed portion is in abutting contact with another side surface of the standing plate. Thus, the bar-like member can be fixed to the standing plate sandwiched between the base end portion and fixed portion of the bar-like member. Consequently, the bar-like member can be reinforced using the standing plate, allowing the bar-like member to be restrained from being deflected in the thickness direction of the standing plate.

In the construction machine, preferably, the base end portion of the bar-like member is attached to a side surface of the standing plate so as to be inserted through an insertion hole formed in the standing plate.

In this aspect, the base end portion of the bar-like member is inserted through the insertion hole of the standing plate. This enables movement of the bar-like member in a direction orthogonal to the insertion direction to be regulated, allowing the bar-like member to be positioned. For example, when the insertion hole is formed in the standing plate so that the bar-like member can be inserted into the insertion hole substantially in the horizontal direction, the bar-like member can be positioned in the height direction (that is, the up-down direction) of the standing plate. Furthermore, the bar-like member can be positioned without any jig after the bar-like member is inserted through the insertion hole and before the bar-like member is fixed to the upper frame. Consequently, assembly operability is improved.

In the construction machine, preferably, the standing plate has a lateral pair of vertical plates extending in a front-rear direction, and a horizontal beam extending in a lateral direction orthogonally to the vertical plate, the insertion hole is formed in the lateral direction relative to the vertical plate, and the bar-like member is folded in such a manner that the outer peripheral surface of the fixed portion comes into abutting contact with a side surface of the horizontal beam in the front-rear direction.

In this aspect, the base end portion of the bar-like member is inserted through the insertion hole in the vertical plate in the lateral direction, and the outer peripheral surface of the fixed portion is in abutting contact with the side surface of the horizontal beam in the front-rear direction. In such a configuration, during assembly after the base end portion of the bar-like member is inserted through the insertion hole and before the bar-like member is fixed to the upper frame, the bar-like member can be slid along the side surface of the horizontal beam. Thus, during the assembly, the position of the bar-like member can be adjusted in the lateral direction, while the movement of the bar-like member in the front-rear direction is being regulated.

In the construction machine, preferably, the bar-like member has an upper disposed portion disposed to overlap the standing plate from above, and a support plate to support, from below, the arranging member arranged along the upper disposed portion is provided on the upper disposed portion of the bar-like member.

In this aspect, the arranging member can be arranged along the upper disposed portion so as to overlap the standing plate from above. However, if the arranging member is arranged above the standing plate, when, for example, the construction member vibrates, a part of the arranging member positioned between the binding bands may move downward and come into contact with and be damaged by a corner portion of an upper end portion of the standing plate. Thus, as in this aspect, the support plate, which supports the arranging member from below, is provided to enable the arranging member to be restrained from being damaged.

In the construction machine, preferably, the upper disposed portion extends in a direction crossing the standing plate in plan view, and the support plate is provided at an intersection point between the upper disposed portion and the standing plate in plan view.

According to this aspect, when the upper disposed portion and the arranging member are placed in a direction crossing the standing plate in plan view, the arranging member can be reliably prevented from being damaged at the intersection between the upper disposed portion and the standing plate.

As described above, the present invention produces a practical effect of enabling the arranging member including at least one of either hydraulic piping or electric wiring to be fixed to the upper frame using a relatively simple configuration. Therefore, the present invention is very useful and has high industrial applicability.

This application is based on Japanese Patent application No. 2013-125877 filed in Japan Patent Office on Jun. 14, 2013, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:

1. A construction machine in which a flexible arranging member is arranged, the construction machine comprising:
   an upper frame including a bottom plate and a standing plate standing on the bottom plate;
   a bar-like member having a leading end portion, a base end portion opposite to the leading end portion, and a fixed portion provided between the leading end portion and the base end portion and fixed to the upper frame; and
   a binding band for binding the bar-like member and the arranging member together in order to fix the arranging member arranged along the bar-like member,
   wherein the fixed portion of the bar-like member is formed by folding the bar-like member between the base end portion and the leading end portion, and has an outer peripheral surface fixed to the upper frame in abutting contact with the upper frame, and
   the leading end portion of the bar-like member is positioned away from the upper frame by fixing the outer peripheral surface of the fixed portion to the upper frame.

2. The construction machine according to claim 1, wherein the base end portion of the bar-like member is attached to the upper frame, and
   the leading end portion of the bar-like member is located above the standing plate.

3. The construction machine according to claim 1, wherein the base end portion of the bar-like member is attached to one side surface of the standing plate, and
   the bar-like member is folded in such a manner that the outer peripheral surface of the fixed portion is in abutting contact with another side surface of the standing plate.

4. The construction machine according to claim 1, wherein the base end portion of the bar-like member is attached to a side surface of the standing plate so as to be inserted through an insertion hole formed in the standing plate.

5. The construction machine according to claim 4, wherein the standing plate includes a lateral pair of vertical plates extending in a front-rear direction, and a horizontal beam extending in a lateral direction orthogonally to the vertical plate,
   the insertion hole is formed in the lateral direction relative to the vertical plate, and
   the bar-like member is folded in such a manner that the outer peripheral surface of the fixed portion comes into abutting contact with a side surface of the horizontal beam in the front-rear direction.

6. The construction machine according to claim 1, wherein the bar-like member includes an upper disposed portion disposed to overlap the standing plate from above, and
   a support plate to support, from below, the arranging member arranged along the upper disposed portion is provided on the upper disposed portion of the bar-like member.

7. The construction machine according to claim 6, wherein the upper disposed portion extends in a direction crossing the standing plate in plan view, and
   the support plate is provided at an intersection point between the upper disposed portion and the standing plate in plan view.

* * * * *